United States Patent

Sugiyama et al.

[11] Patent Number: 5,862,175
[45] Date of Patent: Jan. 19, 1999

[54] DIGITAL TRANSMISSION APPARATUS USING DIFFERENTIAL CODING AND FORWARD ERROR CORRECTION

[75] Inventors: Takatoshi Sugiyama; Masahiro Umehira, both of Yokohama, Japan

[73] Assignee: Nippon Telegraph and Telephone Corporation, Tokyo, Japan

[21] Appl. No.: 753,726

[22] Filed: Nov. 29, 1996

[30] Foreign Application Priority Data

Nov. 30, 1995 [JP] Japan .................................... 7-312803

[51] Int. Cl.$^6$ .............................. H04B 1/38; H04B 7/216; H04L 23/02; H04J 3/24
[52] U.S. Cl. .......................... 375/219; 375/261; 375/321; 370/335; 370/474; 370/513
[58] Field of Search ..................................... 375/219, 321, 375/261, 358; 370/335, 474, 395, 513, 347; 371/39.1, 37.7, 37.02; 342/419, 357

[56] References Cited

U.S. PATENT DOCUMENTS

| | | | |
|---|---|---|---|
| 4,581,736 | 4/1986 | Dobyns et al. | 370/321 |
| 4,862,457 | 8/1989 | Morimoto | 371/42 |
| 4,998,253 | 3/1991 | Ohashi et al. | 371/43 |
| 5,280,537 | 1/1994 | Sugiyama et al. | 375/200 |
| 5,574,717 | 11/1996 | Tomizawa et al. | 370/244 |

FOREIGN PATENT DOCUMENTS 63-219252  9/1988  Japan .

OTHER PUBLICATIONS

T. Sugiyama et al., "A New Concatenated FEC Scheme for Differentially Detected QPSK Signals", Proceedings of the 1996 IEEE International Symposium on Information Theory and Its Applications, pp. 375–378, Sep. 17, 1996.

Primary Examiner—Chi H. Pham
Assistant Examiner—Khai Tran
Attorney, Agent, or Firm—Finnegan, Henderson, Farabow, Garrett & Dunner, L.L.P.

[57] ABSTRACT

A digital transmission apparatus is provided, by which the amount of transmission delay and circuit miniaturization can be realized in the case of using an FEC method together with a differential coding method. In the digital transmission apparatus, a digital signal to be transmitted is serial-to-parallel-converted into parallel n-channel signals; each signal is FEC-encoded and encoded signals are then differentially encoded; and a carrier is modulated by the parallel n-channel differentially-encoded signals to be transmitted as a $2^n$ multi-level modulated signal. The signal is detected at the receiving side and parallel n-channel demodulated and decoded signals are output; FEC decoding is performed; and the parallel n-channel digital signals after FEC decoding is parallel-to-serial-converted. When block coding is used as an FEC method, parallel n-channel digital signals to be transmitted are respectively processed by block-encoding of the same logic; the parallel n-channel signals after encoding are differentially encoded; and a carrier is modulated by the parallel n-channel differentially-encoded signals to be transmitted as a $2^n$ multi-level modulated signal. At the receiving side, parallel n-channel signals after detection are stored; syndrome data for detecting an error bit position for each signal is calculated; and based on the syndrome data, time-series detection of each error bit position is performed so as to correct the errors included in the stored signals.

8 Claims, 8 Drawing Sheets

DIGITAL TRANSMISSION APPARATUS USING DIFFERENTIAL CODING AND FORWARD ERROR CORRECTION

BACKGROUND OF THE INVENTION

1. Field of the Invention

The present invention relates to a digital transmission apparatus, especially one which uses a forward error correction (FEC) method together with a differential coding and modulation method to which a differential detection, which is effective for circuit miniaturization and reduction of power consumption, can be applied.

2. Description of the Related Art

In the case of using an FEC method together with the differential coding and modulation method for performing the digital transmission, i) at the transmission side, after FEC encoding is performed, differential encoding and phase modulation are performed; and ii) at the receiving side, after differential detection, or a set of coherent detection and differential decoding are performed, FEC decoding is performed. Such digital transmission apparatuses are generally called "digital transceivers" in the radio transmission field.

In digital signal transmission using such a method, the major problem is in error patterns found after the detection of a differentially encoded signal, which show double symbol errors (i.e., two successive symbol errors); thus, error-correction capability for FEC methods (especially, for a random FEC method) may not be sufficiently used. Therefore, in order to fully bring the correcting capability into the randomization of the double symbol errors found after the detection of a differentially encoded signal, the interleaving (method) is generally used.

FIG. 8 is a block diagram for explaining a conventional FEC method used for differential coding and modulation.

In the figure, at the transmission side, a digital signal to be transmitted is input into terminal 52. The information bit rate of this digital signal is indicated by "fb". The signal input into terminal 52 is FEC-encoded by FEC encoder 53.

The output from the FEC encoder 53 is input into interleaver 54, where the bit-order of the output is converted. The output from interleaver 54 is input into differential encoder 55, where differential encoding is performed. The output from the differential encoder 55 is input into binary phase shift keying modulator 56 to be modulated. The output from the modulator 56 is transmitted via transmission path 57.

At the receiving side, the signal received from the transmission path 57 is demodulated and decoded by differential detector 58. The output form the differential detector 58 is input into deinterleaver 59 where inverse conversion with respect to the conversion performed in interleaver 54 is performed. In this way, double symbol errors appearing after the differential detection are randomized; therefore, successive errors are dispersed. The output from deinterleaver 59 is FEC-decoded in FEC decoder 60. The output from FEC decoder 60 is then output from terminal 61. The information bit rate of the signal output from terminal 61 is the same as "fb" of the signal which was input into terminal 52.

However, in this arrangement, it is necessary to provide an interleaver at the transmission side and a deinterleaver at the receiving side; thus, there has occurred a first problem in which the circuit size and the amount of transmission delay increase.

In addition, in the case of transmitting plural digital signals via plural parallel channels in the above-explained conventional system of using the FEC method together with the differential coding and modulation method, if error bit position detecting circuits are respectively provided for the FEC with respect to each channel, the circuit size of the system becomes larger. In particular, if the number of bits to be corrected becomes large, the amount of bit position information for FEC increases. Accordingly, there has occurred a second problem in which the size of the error bit position detecting circuits for correcting these error bits becomes larger.

SUMMARY OF THE INVENTION

The present invention was made to solve the conventional problems, and it is an object of the present invention to provide a digital transmission apparatus having a simpler constitution and having sufficient FEC capability in the case of using an FEC method together with the differential coding and modulation method. In particular, regarding the first problem, circuit miniaturization and reduction of the amount of transmission delay are objectives, while regarding the second problem, circuit miniaturization is an objective.

Accordingly, the present invention provides a digital transmission apparatus comprising: in the transmission side, serial-to-parallel converting means for serial-to-parallel converting a digital signal to be transmitted into parallel n-channel signals, n being an integer of 2 or more; FEC encoding means, consisting of parallel n-units, for FEC-encoding the parallel n-channel digital signals obtained by the serial-to-parallel converting means, respectively; differential encoding means for performing differential encoding with respect to the parallel n-channel signals, which were FEC-encoded by the FEC encoding means, as inputs; and $2^n$ multi-level modulation means for modulating a carrier by the parallel n-channel differentially encoded signals obtained by the differential encoding means; and in the receiving side, detection means for demodulating and decoding the signal which was differentially decoded and $2^n$-multi-level-modulated, and for outputting parallel n-channel demodulated and decoded signals; FEC decoding means, consisting of parallel n-units, for FEC-decoding the parallel n-channel signals output from the detection means; and parallel-to-serial converting means for parallel-to-serial converting the parallel n-channel digital signals which were FEC-decoded by the FEC decoding means, and for outputting the converted signal.

In the above apparatus, after a signal to be transmitted is converted into n-channel signals by serial-to-parallel conversion, the following operations are performed in turn: FEC encoding→differential encoding→$2^n$ phase shift keying modulation→detection→FEC decoding→parallel-to-serial conversion. Accordingly, double symbol errors appearing after detection of a differentially-encoded signal are dispersed into n-channel demodulated and decoded signals without using the interleaving.

In this way, a single error exists in each channel; thus, FEC capability is fully brought out in independent FEC decoding in each channel. Therefore, according to the present invention, the effects similar to those obtained by the interleaving method, in which double symbol errors appearing after the detection of the differentially-encoded signal are randomized, can be obtained. In addition, the amount of transmission delay can be reduced in comparison with the case of using the interleaving method which requires circuits for performing the interleaving in both transmission and receiving sides.

The present invention also provides a digital transmission apparatus comprising: in the transmission side, block encoding means, consisting of parallel n-units, for performing block encoding based on the same logic for FEC, with respect to parallel n-channel digital signals to be transmitted, n being an integer of 2 or more; differential encoding means for performing differential encoding with respect to the parallel n-channel signals, which were block-encoded by the block encoding means, as inputs; and $2^n$ multi-level modulation means for modulating a carrier by the parallel n-channel differentially encoded signals obtained by the differential encoding means; and in the receiving side, detection means for demodulating and decoding the signal which was differentially decoded and $2^n$-multi-level-modulated, and for outputting parallel n-channel demodulated and decoded signals; memory means, consisting of parallel n-units, for storing the parallel n-channel demodulated and decoded signals obtained by the detection means; syndrome calculation means, consisting of parallel n-units, for calculating syndrome data for detecting an error bit position included in each of the parallel n-channel signals stored in the memory means; first selection control means for selecting and outputting each syndrome calculation result with respect to the parallel n channels in turn; error bit position detecting means for performing time-series detection of each error bit position based on the syndrome calculation results supplied by the first selection control means; second selection control means for distributing error bit position detection results, detected by the error bit position detecting means, into each corresponding channel; and error correcting means, consisting of parallel n-units, for error-correcting error bits included in the parallel n-channel signals store in the memory means based on the error bit position detection results distributed, and for outputting the corrected signals, and further comprising delay means for delaying the parallel n-channel signals by different delay times for each channel, so as to input the parallel n-channel syndrome calculation results into the first selection control means in turn.

In this apparatus, the block coding having high random-FEC capability is used together with the differential coding/modulation method. In this case, syndrome data is calculated for each block; thus, there is some spare time corresponding to a block length, from outputting syndrome data relating to one block, to outputting syndrome data relating to the next block. The present apparatus uses this spare time, and each signal channel is provided with different time delays, so as to select the syndrome calculation results for each channel starting at the lowest delay amount and progressing to the highest delay amount of the corresponding channels. The time-series detection with respect to error positions (for each channel) in the demodulated and decoded signals stored in the memory means are performed, and the corresponding bit for each relevant channel is corrected by error correcting means. In this case, it is possible to correct errors of n-channels by only one error bit position detecting circuit. Therefore, it is unnecessary to provide an independent error bit position detecting circuit for each channel, whereby the circuit size of the error bit position detecting circuits can be reduced in comparison with conventional cases.

In addition, for both digital transmission apparatuses, the coherent detection and differential decoding method or the differential detection method which is effective for circuit miniaturization and reduction of consumption power may be used as a detection method.

DESCRIPTION OF THE PREFERRED EMBODIMENTS

Hereinafter, embodiments according to the present invention will be explained with reference to the drawings.

Figure 1:
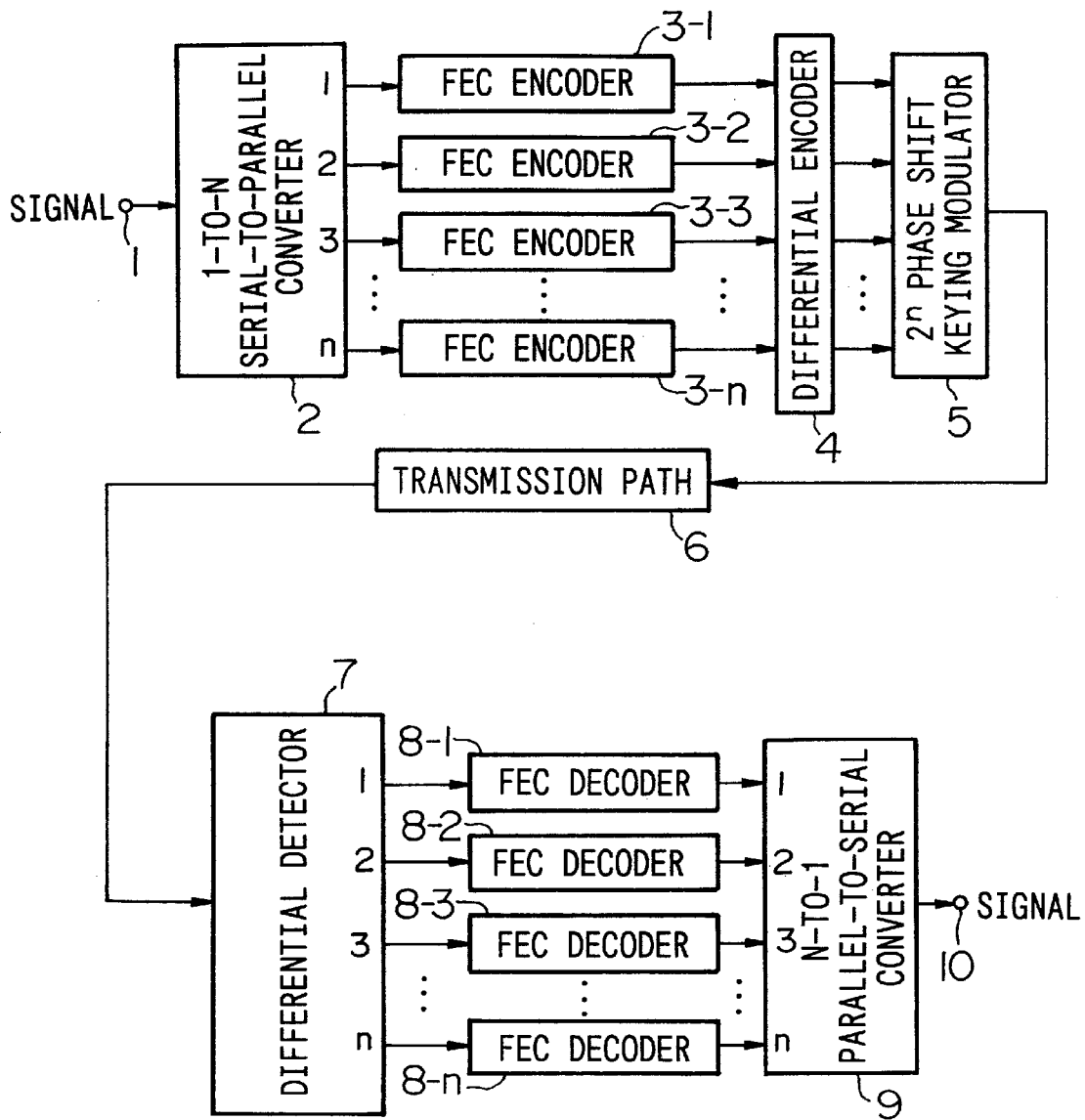
FIG. 1 is a block diagram showing the digital transmission apparatus of the first embodiment according to the present invention.

FIG. 1 shows the construction of the digital transmission apparatus of the first embodiment according to the present invention, and represents, as a block diagram, an arrangement using an FEC method for differential coding/modulation to which differential detection is applied.

In the figure, at the transmission side, a digital signal to be transmitted is input into terminal 1. The information bit rate of this digital signal is indicated by "fb". The signal input into terminal 1 is processed by 1-to-n serial-to-parallel converter 2 to be converted into signals of parallel n-channels, the information bit rate of each signal being "fb/n".

The output signals from the serial-to-parallel converter are respectively FEC-encoded by FEC encoders 3-1~3-n for each channel. As an FEC method, any known method may be used. Here, each number (1, 2, . . . , n) added after the hyphen indicates that the FEC encoder having the number is provided for the channel corresponding to the number. This indication form will be similarly used in other block diagrams later explained.

The outputs from FEC encoders 3-1~3-n are respectively input into differential encoder 4, where differential encoding with respect to n-inputs is performed. The outputs from the differential encoder 4 are input into $2^n$ phase shift keying modulator 5 to be modulated. The output from the modulator 5 is transmitted via transmission path 6. The transmission path 6 may be wired or wireless.

In addition, if an E/O converter (electro-optic converter) is used in the transmission side and an O/E converter (optoelectric converter) is used in the receiving side, an optical transmission path can also be used. These variations may also be used in the following other embodiments.

At the receiving side, the signal received from the transmission path 6 is demodulated and decoded (with respect to the above differential encoding) by differential detector 7. The parallel n-channel outputs from the differential detector 7 are further FEC-decoded by FEC decoders 8-1~8-n, respectively. The parallel n-channel outputs, which were decoded by FEC decoders 8-1~8-n, are input into n-to-1 parallel-to-serial converter 9 to be processed by parallel-to-serial conversion. The output from the parallel-to-serial converter 9 is output from terminal 10. The information bit rate of the signal output from terminal 10 is the same as information bit rate "fb" of the signal which was input into terminal 1.

Figure 2:
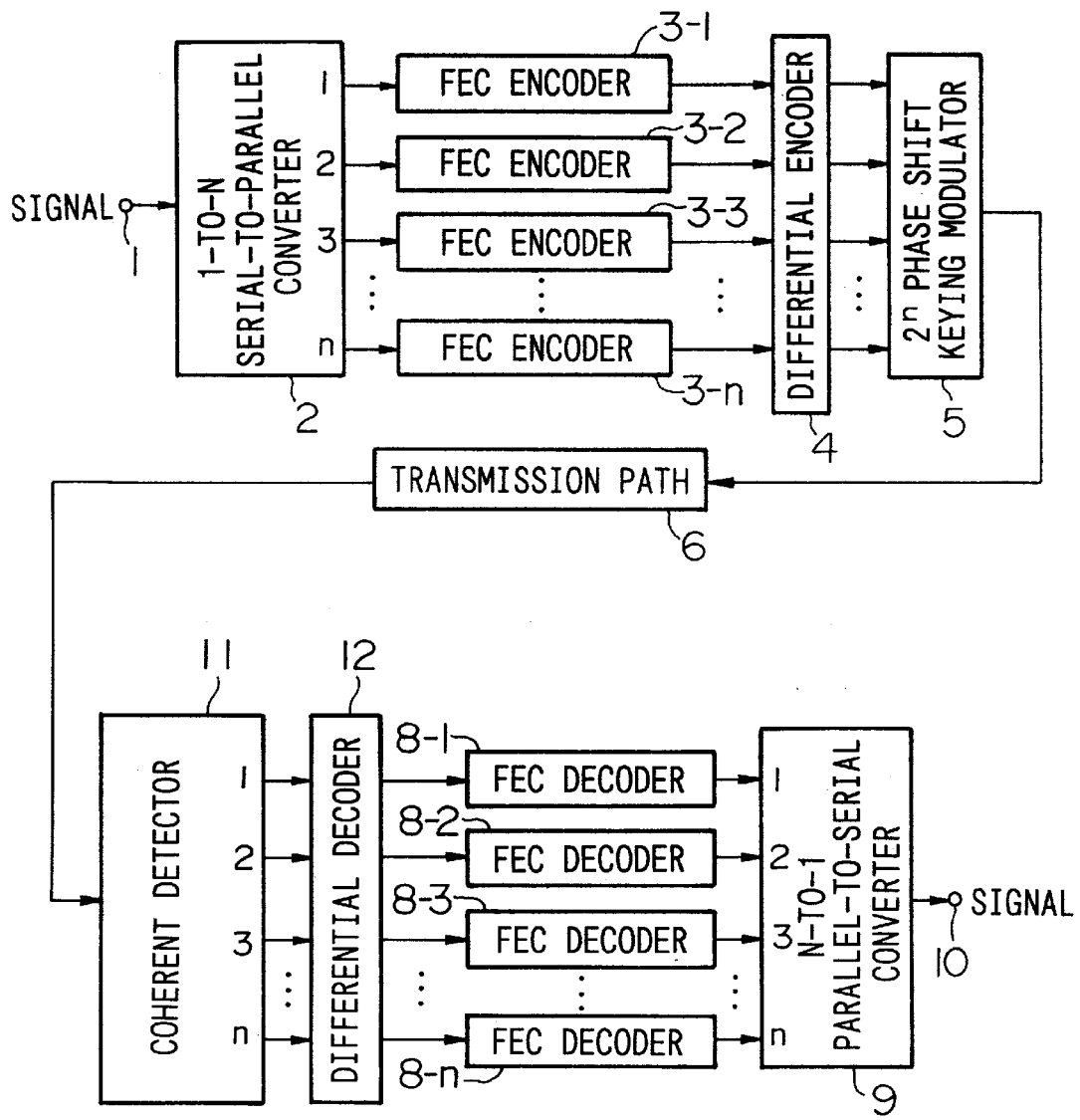
FIG. 2 is a block diagram showing the digital transmission apparatus of the second embodiment according to the present invention.

FIG. 2 shows the construction of the digital transmission apparatus of the second embodiment according to the present invention, and represents, as a block diagram, an arrangement using an FEC method for differential coding/modulation to which coherent detection is applied.

In the figure, parts which are identical to those shown in FIG. 1 are given identical reference numbers, and explanations thereof will be omitted here. That is, the arrangement of the transmission side of the second embodiment is the same as that of the first embodiment.

At the receiving side, the signal received from the transmission path 6 is modulated by coherent detector 11. Parallel n-channel outputs from the coherent detector 11 are respectively input into differential decoder 12 to be differentially decoded. The parallel n-channel outputs from differential decoder 12 are respectively FEC-decoded by FEC decoders 8-1~8-n.

The following operations are the same as those of the first embodiment. That is, the difference between the first and second embodiments exists depending on whether the demodulation and the decoding (with respect to the differential encoding) are simultaneously performed by differential detection, or are independently performed by coherent detection and differential decoding.

Figure 3:
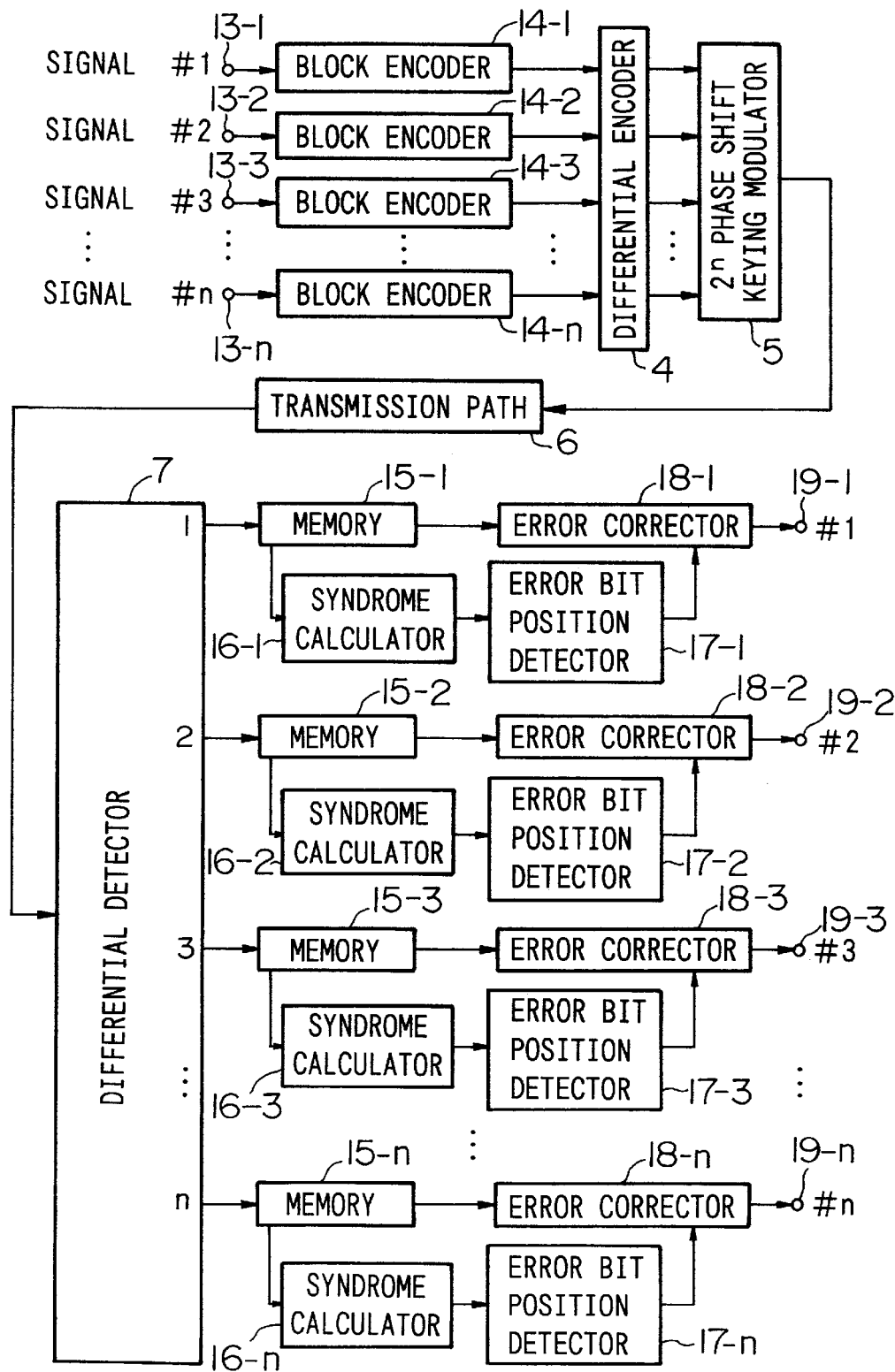
FIG. 3 is a block diagram showing a digital transmission apparatus as a premise for the third embodiment according to the present invention.

FIG. 3 shows an arrangement as a premise for explaining the third embodiment according to the present invention.

In the figure, at the transmission side, parallel n-channel digital signals to be transmitted are respectively input into terminals 13-1~13-n. The information bit rate of each of these digital signals is indicated by "fb". The signals input into terminals 13-1~13-n are FEC-block-encoded by block encoders 14-1~14-n for each channel.

All block encoders 14-1~14-n are based on the same logic. The outputs from the block encoders 14-1~14-n are respectively input into differential encoder 4, where differential encoding with respect to n-inputs is performed. The outputs from the differential encoder 4 are input into $2^n$ phase shift keying modulator 5 to be modulated. The output from $2^n$ phase shift keying modulator 5 is transmitted via transmission path 6.

At the receiving side, the signal received from the transmission path 6 is demodulated and decoded (with respect to the differential encoding) by differential detector 7. The parallel n-channel outputs from the differential detector 7 are respectively stored in memories 15-1~15-n. For the demodulated and decoded signals stored in memories 15-1~15-n, "syndrome (data)" for detecting an error bit position for each channel are calculated by syndrome calculators 16-1~16-n. The outputs from syndrome calculators 16-1~16-n for each channel are input into error bit position detectors 17-1~17-n. The error bit position detectors 17-1~17-n respectively detect an error bit position based on the calculated syndrome data, and output error bit information into error correctors 18-1~18-n.

The error correctors 18-1~18-n correct errors included in the signals stored in memories 15-1~15-n based on the supplied error bit position detection information, respectively, and output error-corrected signals. The outputs from error correctors 18-1~18-n are further output from terminals 19-1~19-n. The information bit rate of each signal output from terminals 19-1~19-n is the same as the information bit rate "fb" of the signals input into terminals 13-1~13-n.

Figure 4:
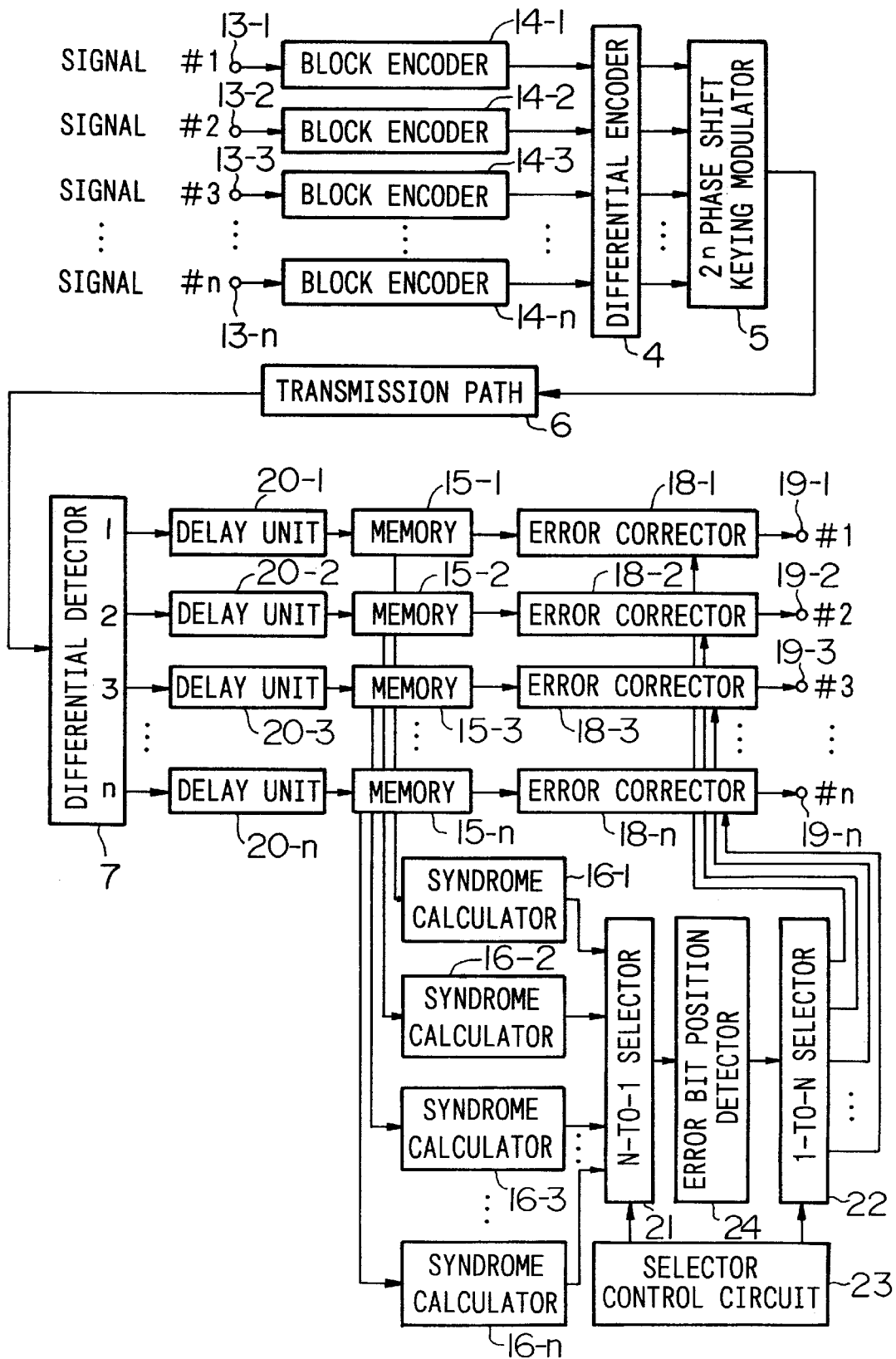
FIG. 4 is a block diagram showing the digital transmission apparatus of the third embodiment according to the present invention.

FIG. 4 is a block diagram showing the digital transmission apparatus of the third embodiment according to the present invention.

In the figure, parts which are identical to those shown in FIG. 1 are given identical reference numbers, and explanations thereof will be omitted here. That is, the arrangement of the transmission side of the second embodiment is the same as that of the third embodiment.

At the receiving side, the parallel n-channel outputs, which were demodulated and decoded by differential detector 7, are respectively input into delay units 20-1~20-n. The delay units 20-1~20-n delay the n-channel signals in a manner such that the delay time for each channel is different from each other. The n-channel signals output from these delay units are respectively stored in memories 15-1~15-n.

Then, for the demodulated and decoded signals stored in memories 15-1~15-n, syndrome data for detecting an error bit position for each channel are calculated by syndrome calculators 16-1~16-n. The n syndrome data output from syndrome calculators 16-1~16-n are input into n-to-1 selector 21. Selector control circuit 23 controls the n-to-1 selector 21 such that the selector 21 selects the input terminals starting at the lowest delay amount and progressing to the highest delay amount of the corresponding channels.

The n-to-1 selector 21 thus selects and inputs each syndrome calculation result from the lowest to the highest delay amounts of the corresponding channels, according to the control of the selector control circuit 23. The time-series outputs from n-to-1 selector 21 are input into error bit position detector 24 in turn, and each error bit position of the relevant channel is detected. The time-series outputs from the error position detector 24 are input into 1-to-n selector 22 in turn. In the 1-to-n selector 22, an output terminal corresponding to each relevant channel from among channels 1-n is selected in turn, according to the control of the selector control circuit 23.

The outputs from the 1-to-n selector 22 are respectively input into corresponding error correctors 18-1~18-n. The error correctors 18-1~18-n correct errors included in the signals stored in memories 15-1~15-n, respectively, based on the error bit position detection results input.

The signals corrected by error correctors 18-1~18-n are output from terminals 19-1~19-n. The information bit rates of n-channel signals output from terminals 19-1~19-n are the same as the information bit rate "fb" of the signals input into terminals 13-1~13-n.

Figure 5:
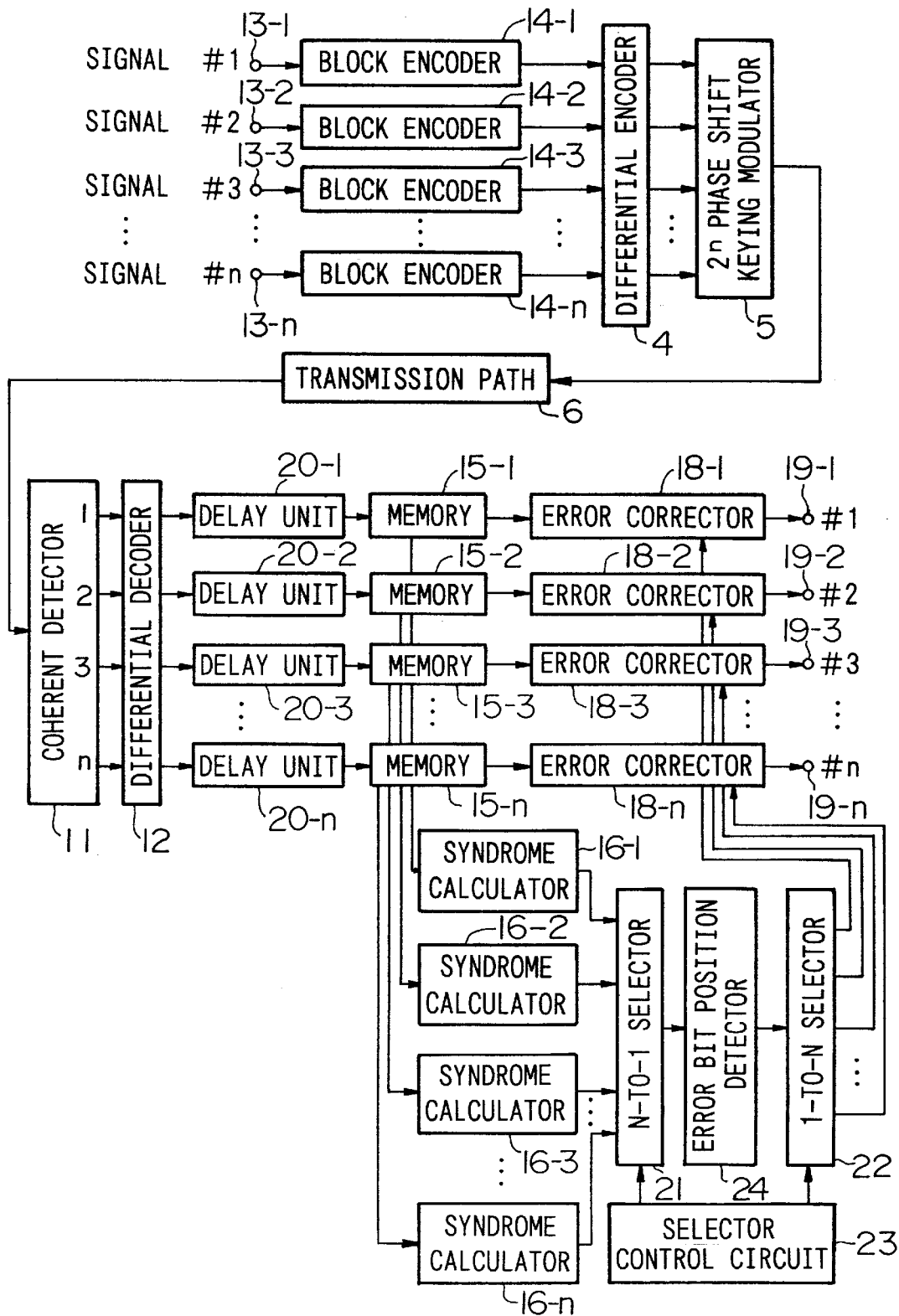
FIG. 5 is a block diagram showing the digital transmission apparatus of the fourth embodiment according to the present invention.

FIG. 5 is a block diagram showing the digital transmission apparatus of the fourth embodiment according to the present invention.

In the figure, parts which are identical to those shown in FIGS. 2 and 4 are given identical reference numbers, and explanations thereof will be omitted here. That is, in the arrangement of the present embodiment, coherent detector 11 and differential decoder 12 are provided in place of differential detector 7; thus, only the detection method used is different.

Figure 6:
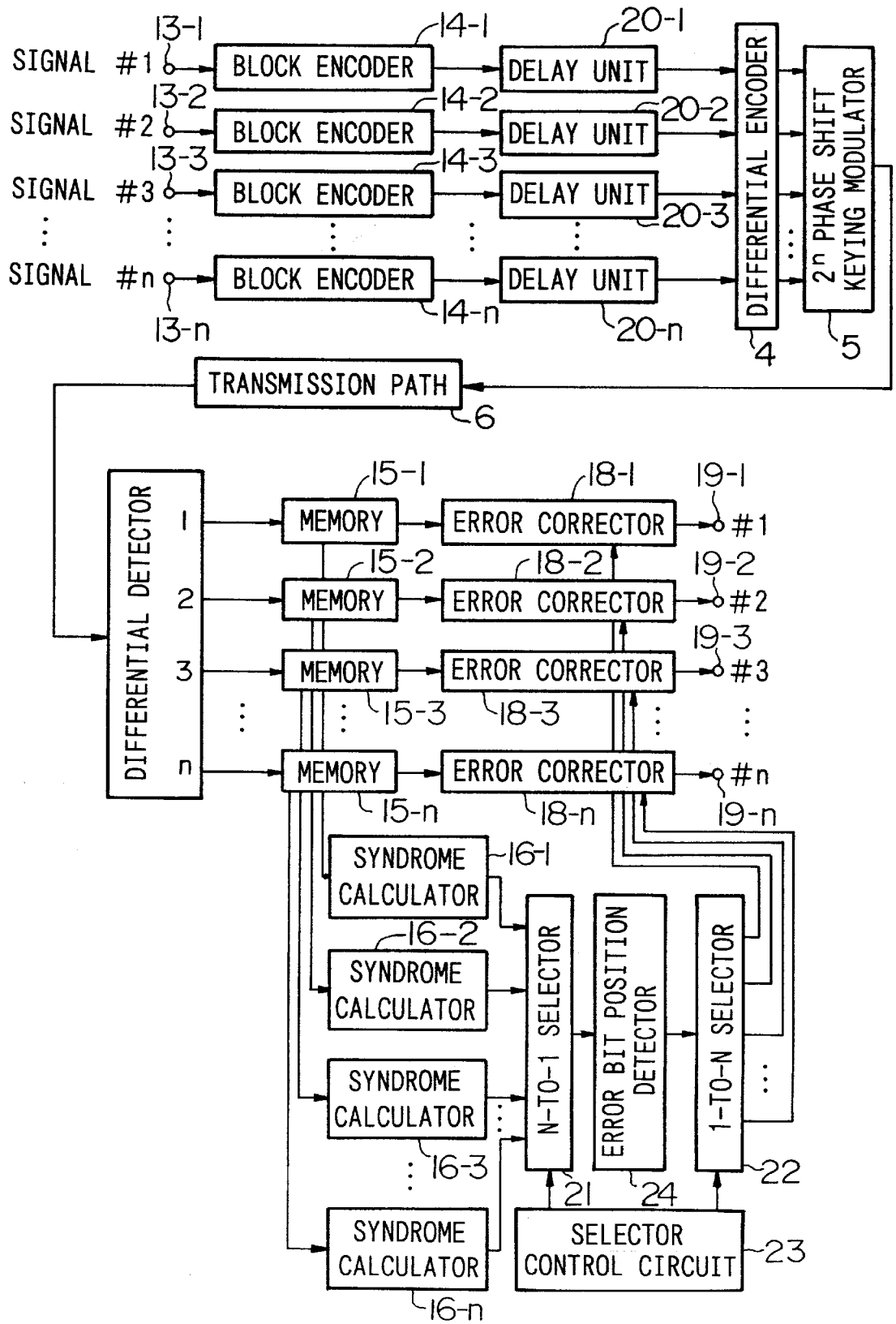
FIG. 6 is a block diagram showing the digital transmission apparatus of the fifth embodiment according to the present invention.

Next, FIG. 6 is a block diagram showing the digital transmission apparatus of the fifth embodiment according to the present invention. In the figure, parts which are identical to those shown in FIG. 4 are given identical reference numbers, and explanations thereof will be omitted here.

That is, in the arrangement of the present embodiment, delay units 20-1~20-n are placed next to the block encoders 14-1~14-n so as to delay the signals by different delay times at the transmission side. Other construction and operations are the same as those of the third embodiment as shown in FIG. 4.

Figure 7:
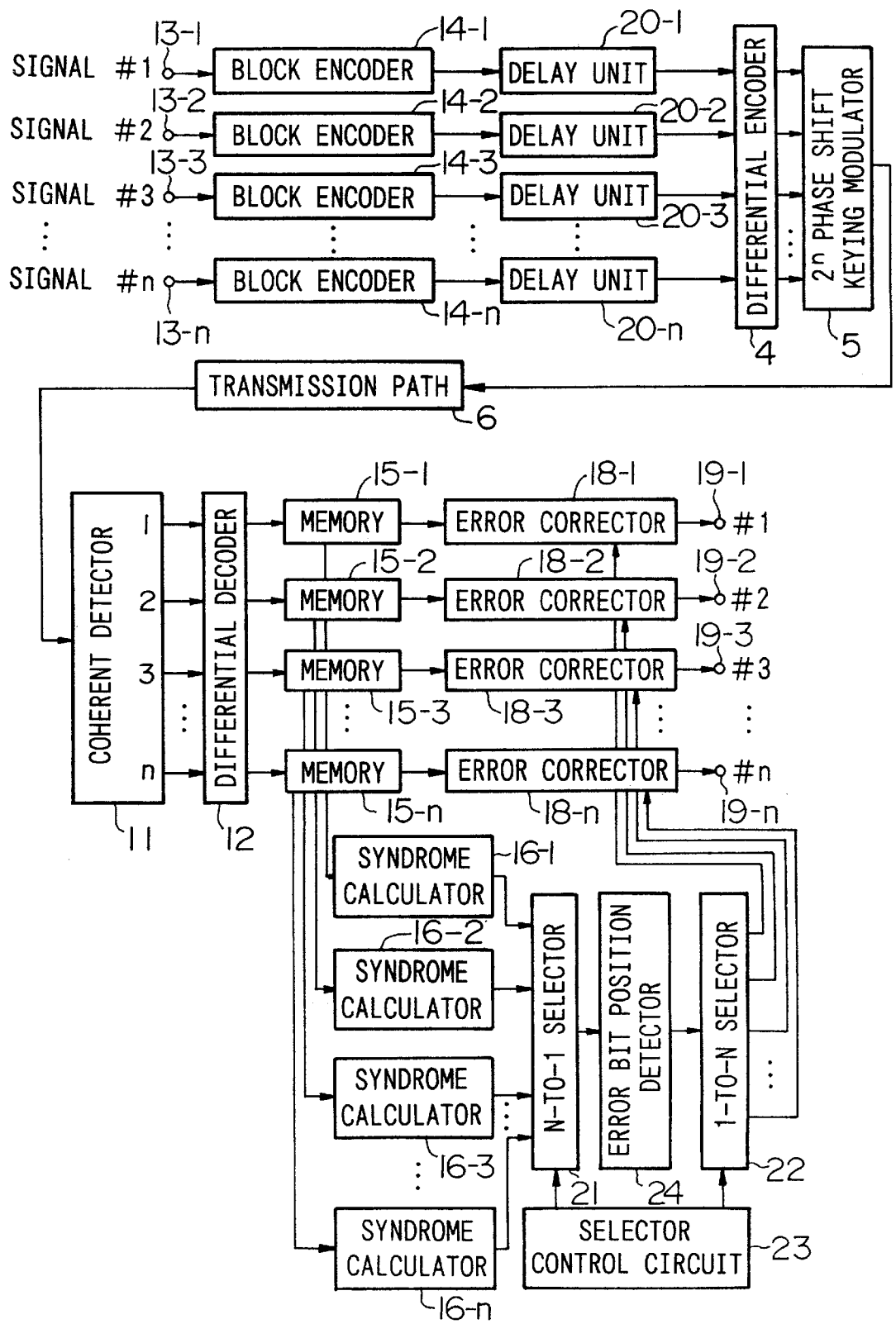
FIG. 7 is a block diagram showing the digital transmission apparatus of the sixth embodiment according to the present invention.
Figure 8:
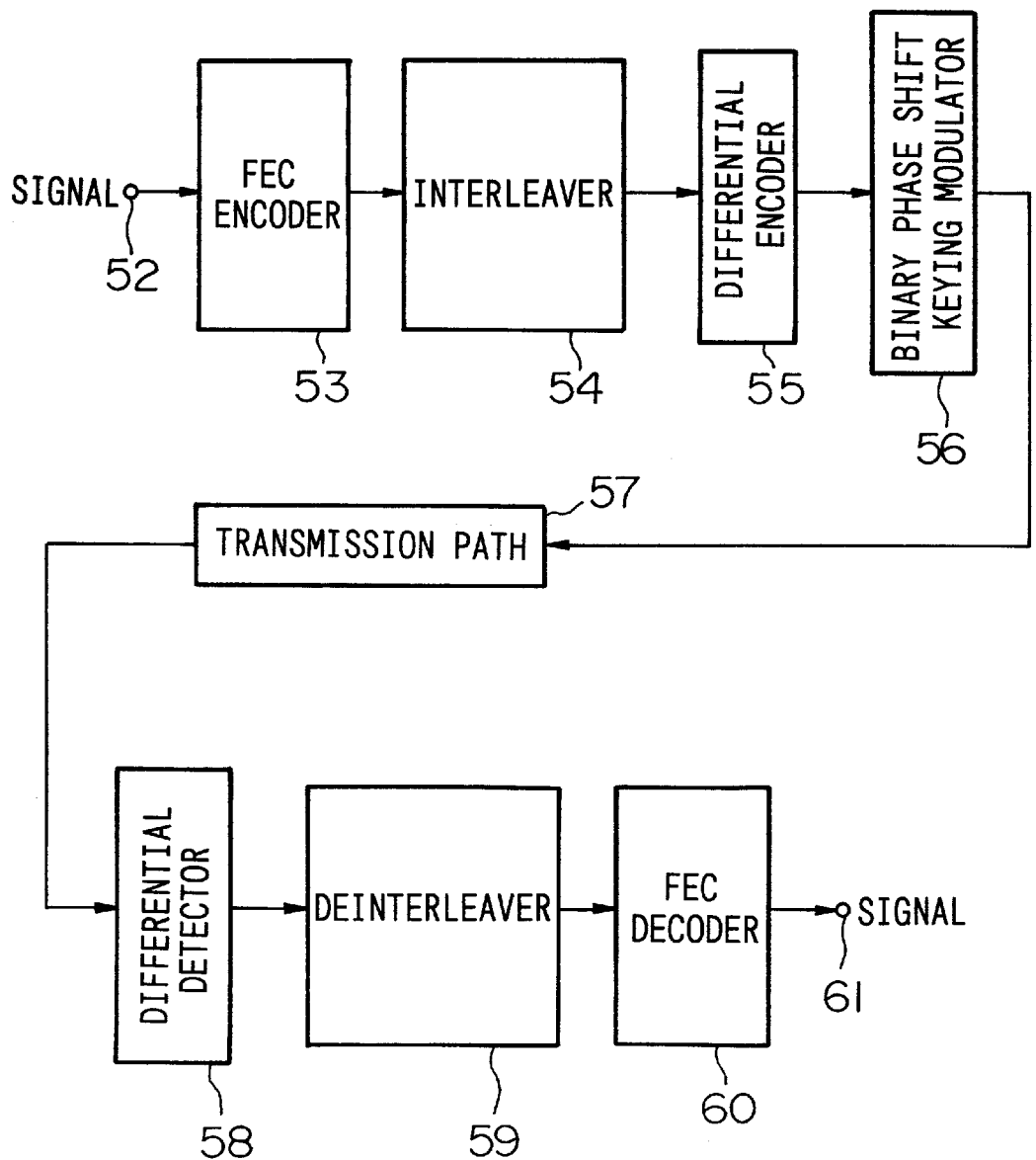
FIG. 8 is a block diagram showing a conventional digital transmission apparatus using an FEC method together with the differential coding and modulation method.

FIG. 7 is a block diagram showing the digital transmission apparatus of the sixth embodiment according to the present invention. In the figure, parts which are identical to those shown in FIGS. 5 and 6 are given identical reference numbers, and explanations thereof will be omitted here.

That is, in the arrangement of the present embodiment, coherent detector 11 and differential decoder 12 are provided in place of differential detector 7; thus, only the detection method used is different.

Additionally, in the above explanations of each embodiment, $2^n$ phase shift keying modulation is used as a modulation method. However, the present invention can also be applied to any arrangement where another multi-level modulation such as $2^n$ AM is used, and in such a case, similar effects can also be obtained.

What is claimed is:

1. A digital transmission apparatus comprising:

in the transmission side,
  serial-to-parallel converting means for serial-to-parallel converting a digital signal to be transmitted into parallel n-channel signals, n being an integer of 2 or more;
  FEC encoding means, consisting of parallel n-units, for FEC-encoding the parallel n-channel digital signals obtained by the serial-to-parallel converting means, respectively;
  differential encoding means for performing differential encoding with respect to the parallel n-channel signals, which were FEC-encoded by the FEC encoding means, as inputs; and
  $2^n$ multi-level modulation means for modulating a carrier by the parallel n-channel differentially-encoded signals obtained by the differential encoding means; and in the receiving side,
  detection means for demodulating and decoding the signal which was differentially encoded and $2^n$-multi-level-modulated, and for outputting parallel n-channel demodulated and decoded signals;
  FEC decoding means, consisting of parallel n-units, for FEC-decoding the parallel n-channel signals output from the detection means; and
  parallel-to-serial converting means for parallel-to-serial converting the parallel n-channel digital signals which were FEC-decoded by the FEC decoding means, and for outputting the converted signal.

2. A digital transmission apparatus as claimed in claim 1, wherein the detection means performs the demodulation and decoding by differential detection.

3. A digital transmission apparatus as claimed in claim 1, wherein the detection means performs the demodulation and decoding by coherent detection and differential decoding.

4. A digital transmission apparatus comprising:

in the transmission side,
  block encoding means, consisting of parallel n-units, for performing block encoding based on the same logic for FEC, with respect to parallel n-channel digital signals to be transmitted, n being an integer of 2 or more;
  differential encoding means for performing differential encoding with respect to the parallel n-channel signals, which were block-encoded by the block encoding means, as inputs; and
  $2^n$ multi-level modulation means for modulating a carrier by the parallel n-channel differentially-encoded signals obtained by the differential encoding means; and in the receiving side,
  detection means for demodulating and decoding the signal which was differentially encoded and $2^n$-multi-level-modulated, and for outputting parallel n-channel demodulated and decoded signals;
  memory means, consisting of parallel n-units, for storing the parallel n-channel demodulated and decoded signals obtained by the detection means;
  syndrome calculation means, consisting of parallel n-units, for calculating syndrome data for detecting an error bit position included in each of the parallel n-channel signals stored in the memory means;
  first selection control means for selecting and outputting each syndrome calculation result with respect to the parallel n channels in turn;
  error bit position detecting means for performing time-series detection of each error bit position based on the syndrome calculation results supplied by the first selection control means;
  second selection control means for distributing error bit position detection results, detected by the error bit position detecting means, into each corresponding channel; and
  error correcting means, consisting of parallel n-units, for error-correcting error bits included in the parallel n-channel signals store in the memory means based on the error bit position detection results distributed, and for outputting the corrected signals, and further comprising delay means for delaying the parallel n-channel signals by different delay times for each channel, so as to input the parallel n-channel syndrome calculation results into the first selection control means in turn.

5. A digital transmission apparatus as claimed in claim 4, wherein the delay means delays the parallel n-channel demodulated and decoded signals output from the detection means by different delay times for each channel.

6. A digital transmission apparatus as claimed in claim 4, wherein the delay means delays the parallel n-channel differentially encoded signals output from the differential encoding means by different delay times for each channel.

7. A digital transmission apparatus as claimed in claim 1, wherein the detection means performs the demodulation and decoding by differential detection.

8. A digital transmission apparatus as claimed in claim 1, wherein the detection means performs the demodulation and decoding by coherent detection and differential decoding.

* * * * *